United States Patent Office 2,898,575
Patented Aug. 4, 1959

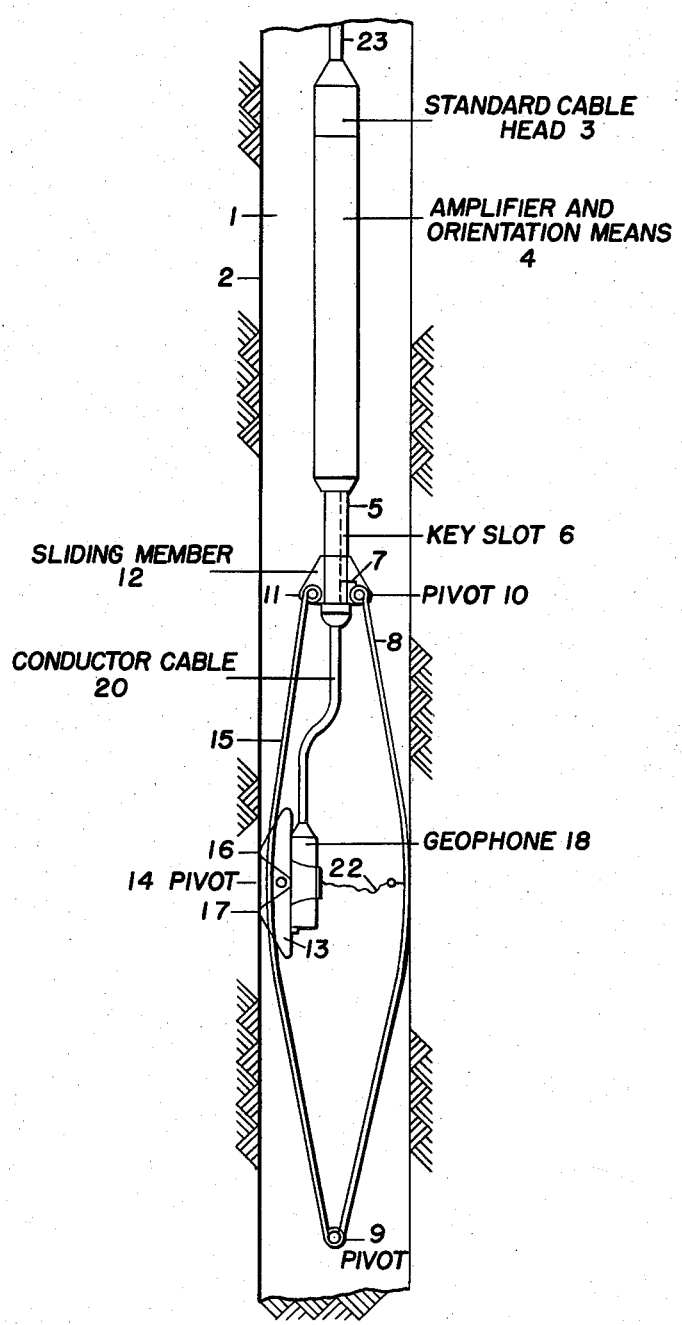

2,898,575

GEOPHONE ASSEMBLY

Alexander B. Hildebrandt, Tulsa, Okla., assignor, by mesne assignments, to Jersey Production Research Company Application March 21, 1956, Serial No. 572,914

4 Claims. (Cl. 340—17)

The present invention is concerned with a novel geophone assembly adapted for use in bore holes in the earth's substrata. In the geophone assembly of the present invention, a bore hole lock-in geophone is mounted on a support pivotally attached to the mid point of one of a pair of bow springs, the support having two outward projections, one above and one below the pivot to insure positive contact with the bore hole wall.

In exploration for petroleum, the nature and characteristics of the earth's substrata is usually determined by techniques of seismic explorations. In such seismic techniques, seismic energy is generated on or near the surface of the earth by means of a suitable detonation or impact. The seismic shocks or waves travel into and through the various earth's substrata. Portions of the downwardly directed energy are reflected or refracted by the various underlying strata or various horizons in the earth's substrata. This reflected or refracted energy is picked up at or near the surface by one or more geophones arranged in suitable arrays. These geophones transpose the various seismic shocks into electrical impulses of varying densities which can be suitably recorded, such as on magnetic tape and the like for permanent records. This general technique makes it possible to obtain information concerning the nature, configuration and depth of the various subsurface strata. These records enable the experienced geologist to predict with some accuracy those locale where it is possible for oil and the petroleum products to exist.

In seismic exploration, it is also generally necessary to determine the velocity of the seismic energy through the various particular earth's strata in order to precisely calculate the depth of the horizons which have reflected the seismic shocks. Thus, in many instances the geophone is placed at different levels in a bore hole so that the velocity of the seismic energy passing through these strata above the geophone can be determined by timing the interval between the generation of the seismic energy at the earth's surface and reception of the seismic energy at the geophone. Deep-hole geophones may also be employed for other purposes. For example, in particular locations, it may be desirable during seismic prospecting to employ vertical arrays of geophones which may be arranged in a bore hole. For these and other purposes, it becomes necessary to provide a geophone or a seismic detector which can receive seismic energy from the wall of a bore hole without distortion of the seismic energy and without the development of spurious signals.

There have been many suggestions concerning the nature of geophones which can be locked in a bore hole. However, there are real problems involved in providing a suitable lock-in geophone arrangement, and these have not yet been completely or satisfactorily solved. For example, if a geophone is simply suspended in a bore hole by means of a cable, vibration of the cable will inevitably cause false signals at the geophone. Again, simple suspension of this type fails to provide effective close coupling of the geophone with the earth which is required in order to detect seismic energy with a minimum of distortion. Furthermore, existing arrangements for tightly forcing the geophone against the wall of the bore hole in order to obtain good coupling normally cause development of false signals. In these present arrangements, the basic difficulty is that the geophone is improperly activated through mechanical coupling with suspension devices, or activated by the loading device which forces the geophone against the wall of the bore hole. It is thus the purpose of this invention to provide a geophone arrangement permitting the geophone to be tightly forced against the wall of the bore hole while being essentially isolated from the mechanical components required to accomplish this.

The nature and principles of the present invention will be understood by reference to the drawing illustrating a preferred embodiment of the geophone assembly.

Referring to the drawing, the geophone assembly of the present invention is shown positioned within a bore hole 1 extending into the earth's sub-strata 2. The geophone assembly is held at the desired position in the bore hole by a standard cable head 3 and a cylindrical element 4 which contains conventional amplifiers.

Projecting and rigidly attached from the bottom of casing 4 is a cylindrical member 5 containing a key slot 6. This cylindrical member serves to hold the geophone assembly at the desired height in the bore hole. At the same time the geophone assembly cannot rotate with respect to housing 4 due to a key 7 of the assembly riding in key slot 6.

The geophone assembly comprises a pair of bow springs 8 and 15 attached to each other by means of pivot 9, pivot 10 and pivot 11, and a sliding member 12 which moves vertically with respect to member 5. A support or shoe element 13 is pivotally mounted by a pivot 14 at about the mid-point of bow spring 15. This support or geophone shoe 13 is characterized by having a projection 16 and a projection 17, one of which is above the pivot 14 and the other of which is below pivot 14. Furthermore, these projections 16 and 17 are characterized in that they extend beyond bow spring 15. While the extent to which these projections extend beyond bow spring 15 may vary appreciably, it is preferred that these projections extend from about 1 to 3″ beyond bow spring 15.

A conventional geophone 18 is suitably mounted on the inner surface of the shoe 13. A conducting cable 20 transmits the signals from the geophone to magnify or pick up equipment positioned within housing 4. These signals are then transmitted to the surface.

In operation, the geophone assembly is lowered to the desired point in the bore hole by cable 23.

The invention comprises the positioning of a geophone on an expandable spring element. Conventional means may be utilized to maintain the springs in a contracted position during the lowering of the assembly to the desired position in the bore hole. Conventional means may then be employed to allow the springs to expand and to position the shoe attached to one of the springs to the side of the bore hole wall.

A simple means of operating the geophone assembly is to simply lower the assembly to the desired position in the bore hole by housing 4 which forces the assembly to the desired position. Undue expansion of the bow springs at very wide parts of the bore hole is prevented by means of a chain or equivalent element 22. When the geophone assembly is at the desired position in the bore hole, the cable is raised, permitting sliding member 12 to slide along member 5. Thus, the geophone assembly is relieved of any excessive tension and the bow springs function to force the geophone in a manner to seat two points along the bore hole wall irrespective of the irregularities of the wall. In a preferred adaptation of the present invention, the projections of the shoe are made of a hard metal such as tungsten carbide and the like. These projections can be attached as insets.

The geophone of the present invention will avoid or minimize the tube waves and will be more sensitive to the refracted or reflected vertical wave.

What is claimed is:

1. Improved geophone assembly adapted for picking up down-hole seismic signals which comprises a pair of expandable bow springs attached to each other at one end by a pivot member and at the other end by a head element, said head element being adapted to be attached to a support member, a movable shoe member pivotally attached to one of said bow springs at about the center thereof, said shoe element being characterized by having two points extending outwardly beyond said bow spring, one of said points being above the pivot and the other of said points being below the pivot, a geophone attached to a back surface of said shoe element, and suitable means for transmitting the seismic signals back up by said geophone to the surface.

2. Geophone assembly as defined by claim 1 wherein said points extend from about 1–3 inches outwardly beyond said bow spring.

3. Apparatus as defined by claim 1 wherein a chain element is attached to said shoe and to said other spring, whereby undue outward expansion of said bow springs is prevented.

4. Apparatus as defined by claim 1 wherein said head element is movable vertically with respect to said support member, whereby said shoe can be positioned against the bore hole wall and the said support member lowered, thereby removing tensions on said assembly.

References Cited in the file of this patent

UNITED STATES PATENTS

| | | |
|---|---|---|
| 1,905,200 | Williams | Apr. 25, 1933 |
| 2,322,343 | Brandon | June 22, 1943 |
| 2,396,935 | Wolstrom | Mar. 19, 1946 |
| 2,588,717 | Goodwin | Mar. 11, 1952 |
| 2,812,587 | Roussin | Nov. 12, 1957 |